(12) United States Patent
Arakawa

(10) Patent No.: US 7,091,512 B2
(45) Date of Patent: Aug. 15, 2006

(54) RADIATION IMAGE READ-OUT APPARATUS

(75) Inventor: Satoshi Arakawa, Kaisei-machi (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 356 days.

(21) Appl. No.: 10/668,224

(22) Filed: Sep. 24, 2003

(65) Prior Publication Data
US 2004/0061061 A1    Apr. 1, 2004

(30) Foreign Application Priority Data
Sep. 25, 2002    (JP)    ............................ 2002-279249

(51) Int. Cl.
*G03B 42/08* (2006.01)
(52) U.S. Cl. ...................... 250/586; 250/584
(58) Field of Classification Search ............... 250/586, 250/584
See application file for complete search history.

(56) References Cited

U.S. PATENT DOCUMENTS

| | | | |
|---|---|---|---|
| 6,326,636 B1 | 12/2001 | Isoda et al. | |
| 6,521,908 B1 | 2/2003 | Isoda et al. | |
| 6,605,820 B1 | 8/2003 | Isoda et al. | |
| 2001/0028047 A1* | 10/2001 | Isoda | 250/586 |
| 2001/0052582 A1* | 12/2001 | Isoda | 250/584 |
| 2002/0040973 A1* | 4/2002 | Arakawa | 250/586 |
| 2002/0100885 A1* | 8/2002 | Isoda et al. | 250/586 |

* cited by examiner

*Primary Examiner*—Albert Gagliardi
(74) *Attorney, Agent, or Firm*—Sughrue Mion, PLLC

(57) ABSTRACT

A radiation image read-out apparatus is provided with a line sensor which detects stimulated emission emitted from a radiation image convertor panel upon exposure to a line-like stimulating light beam extending in a main scanning direction and reads out a radiation image recorded on the radiation image convertor panel while moving the line sensor and the radiation image convertor panel relatively to each other in a sub-scanning direction intersecting the main scanning direction. The line sensor includes a CCD having a number of light receiving portions two-dimensionally arranged along the main scanning direction and outputs electric charges obtained by photoelectrically converting the stimulated emission received by the light receiving portions after binning the electric charges in a direction perpendicular to the main scanning direction.

7 Claims, 4 Drawing Sheets

RADIATION IMAGE READ-OUT APPARATUS

BACKGROUND OF THE INVENTION

1. Field of the Invention

This invention relates to a radiation image read-out apparatus, and more particularly to a radiation image read-out apparatus in which stimulated emission emitted from a radiation image convertor panel is detected by a line sensor formed of a CCD.

2. Description of the Related Art

When certain kinds of phosphor are exposed to radiation such as X-rays, they store a part of energy of the radiation. Then when the phosphor which has been exposed to the radiation is exposed to stimulating light such as visible light, light is emitted from the phosphor in proportion to the stored energy of the radiation. A phosphor exhibiting such properties is generally referred to as "a stimulable phosphor". In this specification, the light emitted from the stimulable phosphor upon stimulation thereof will be referred to as "stimulated emission". There has been known a radiation image recording and reproducing system, comprising a radiation image recording apparatus and a radiation image read-out apparatus, as a CR (computed radiography) in which a layer of the stimulable phosphor is exposed to a radiation passing through an object such as a human body to have a radiation image of the object stored on the stimulable phosphor sheet as a latent image, stimulating light such as a laser beam is projected onto the stimulable phosphor sheet, and the stimulated emission emitted from the stimulable phosphor sheet is photoelectrically detected, thereby obtaining an image signal (a radiation image signal) representing a radiation image of the object.

There has been known a radiation image convertor panel comprising a stimulable phosphor layer formed on a substrate as a recording medium employed in the radiation image recording and reproducing system. As the radiation image read-out apparatus, there has been known an apparatus which detects stimulated emission emitted from a radiation image convertor panel upon exposure to a line-like stimulating light beam extending in a main scanning direction by a line sensor comprising a CCD having a number of light receiving portions and, while moving the line sensor and the radiation image convertor panel relatively to each other in a sub-scanning direction perpendicular to the main scanning direction. See, for instance, U.S. Pat. Nos. 6,326,636, 6,521,908, and 6,605,820. The resolution in the main scanning direction of a radiation image read out by the line sensor from the radiation image convertor panel is governed by the pitch at which the light receiving portions are arranged in the main scanning direction. Whereas the resolution in the sub-scanning direction of the same is governed by the width in the sub-scanning direction perpendicular to the main scanning direction of the stimulating light beam projected onto the radiation image convertor panel.

Since the stimulated emission emitted from a radiation image convertor panel is weak, the amplification factor becomes large in order to amplify electric charges obtained by photoelectrically converting stimulated emission and to convert the electric charges into a digital image signal representing a radiation image, which results in increase of noise in the image signal. There has been a requirement for reduction of noise in the image signal, thereby improving the quality of radiation image represented by the image signal. Accordingly, to increase in S/N of the image signal by enlarging each light receiving portion in the sub-scanning direction to increase the amount of the stimulated emission received by the line sensor is being studied. Even if each light receiving portion is increased in the sub-scanning direction, the resolution can be held unchanged in the main scanning direction and the sub-scanning direction for the reason described above.

However, this approach is disadvantageous in that when the amount of the stimulated emission received by the line sensor is increased by enlarging each light receiving portion in the sub-scanning direction, the electric potential gradation per unit length on the light receiving face is reduced and storing of the next electric charges is started before a part of the electric charges is left unreleased from the light receiving portion. The part of the electric charges left in the light receiving portion generates noise in the image signal.

Further, when the amount of the stimulated emission received by the line sensor is increased by increasing the number of rows of the light receiving portions in the sub-scanning direction with the size of each light receiving portion in the sub-scanning direction held unchanged, the image signal components obtained from respective light receiving portions adjacent to each other in the sub-scanning direction must be added into an image signal component for a pixel corresponding to the light receiving portions after respectively amplified. When adding the two image signal components after amplification, amplified noises for the two image signal components are also added. Accordingly, the ratio of the amplified noise in an image signal obtained is substantially the same as that in an image signal obtained through a row of light receiving portions, which shows that the S/N cannot be improved even if the amount of the stimulated emission received by the line sensor is increased by increasing the number of rows of the light receiving portions in the sub-scanning direction.

SUMMARY OF THE INVENTION

In view of the foregoing observations and description, the primary object of the present invention is to provide a radiation image read-out apparatus which can improve the S/N of an image signal representing a radiation image read out through a line sensor without deteriorating the resolution of the image signal.

In accordance with the present invention, there is provided a radiation image read-out apparatus which is provided with a line sensor which detects stimulated emission emitted from a radiation image convertor panel upon exposure to a line-like stimulating light beam extending in a main scanning direction and reads out a radiation image recorded on the radiation image convertor panel while moving the line sensor and the radiation image convertor panel relatively to each other in a sub-scanning direction intersecting the main scanning direction, wherein the line sensor comprises a CCD having a number of light receiving portions two-dimensionally arranged along the main scanning direction and outputs electric charges obtained by photoelectrically converting the stimulated emission received by the light receiving portions after binning the electric charges in a direction perpendicular to the main scanning direction.

The line sensor may be able to receive stimulated emission emitted from the radiation image convertor panel over its entire width. The line sensor may comprise a plurality of CCDs. In this case, the CCDs may be, for instance, arranged end to end in the main scanning direction or in a staggered fashion.

The line sensor has light receiving portions which are arranged in a direction perpendicular to the main scanning direction preferably at least over a distance twice the width of the stimulating light beam, and more preferably at least five times the width of the stimulating light beam.

The "width of the stimulating light beam" as used here means the width of the area having an intensity not lower than $1/e^2$ of the peak value in the light intensity distribution along a cross-sectional area of the beam perpendicular to the main scanning direction.

It is preferred that the pixel size in the main scanning direction of the light receiving portions be smaller than a pixel size which is the largest in pixel sizes at which a radiation image can be read out from the radiation image convertor panel at a predetermined resolution in the main scanning direction. The "predetermined resolution" is resolution required for a radiation image read out from the radiation image convertor panel. For example, when the radiation image read out from the radiation image convertor panel is used for a medical purpose, the "predetermined resolution" is about 100 □m to 200 □m.

It is preferred that the line sensor be provided with a micro lens array extending in a direction perpendicular to the main scanning direction in front thereof. It is further preferred that the micro lens array be provided over an area including the light receiving portions and the charge transfer paths of the CCD.

In accordance with the radiation image read-out apparatus of this embodiment, since the line sensor outputs electric charges obtained by photoelectrically converting the stimulated emission received by the light receiving portions after binning the electric charges in a direction perpendicular to the main scanning direction, amplified noises are not added when the electric charges added by amplifying the electric charges output from the line sensor though a plurality of light receiving portions are arranged in a direction perpendicular to the main scanning direction in order to increase the light receiving area in this direction, whereby an image signal component for one pixel can be formed without adding amplified noises for the image signal components obtained through the light receiving portions forming the pixel and accordingly, the S/N of an image signal representing a radiation image can be improved without deteriorating the resolution.

When the line sensor has light receiving portions arranged in a direction perpendicular to the main scanning direction at least over a distance twice the width of the stimulating light beam, the line sensor can receive stimulated emission in a relatively strong region and accordingly, the stimulated emission can be efficiently received. Further when the line sensor has light receiving portions arranged in a direction perpendicular to the main scanning direction at least over a distance five times the width of the stimulating light beam, the line sensor can receive a larger amount of stimulated emission. When the line sensor is provided with a micro lens array extending in a direction perpendicular to the main scanning direction in front thereof, the line sensor can receive a further larger amount of stimulated emission.

DESCRIPTION OF THE PREFERRED EMBODIMENTS

Figure 1:
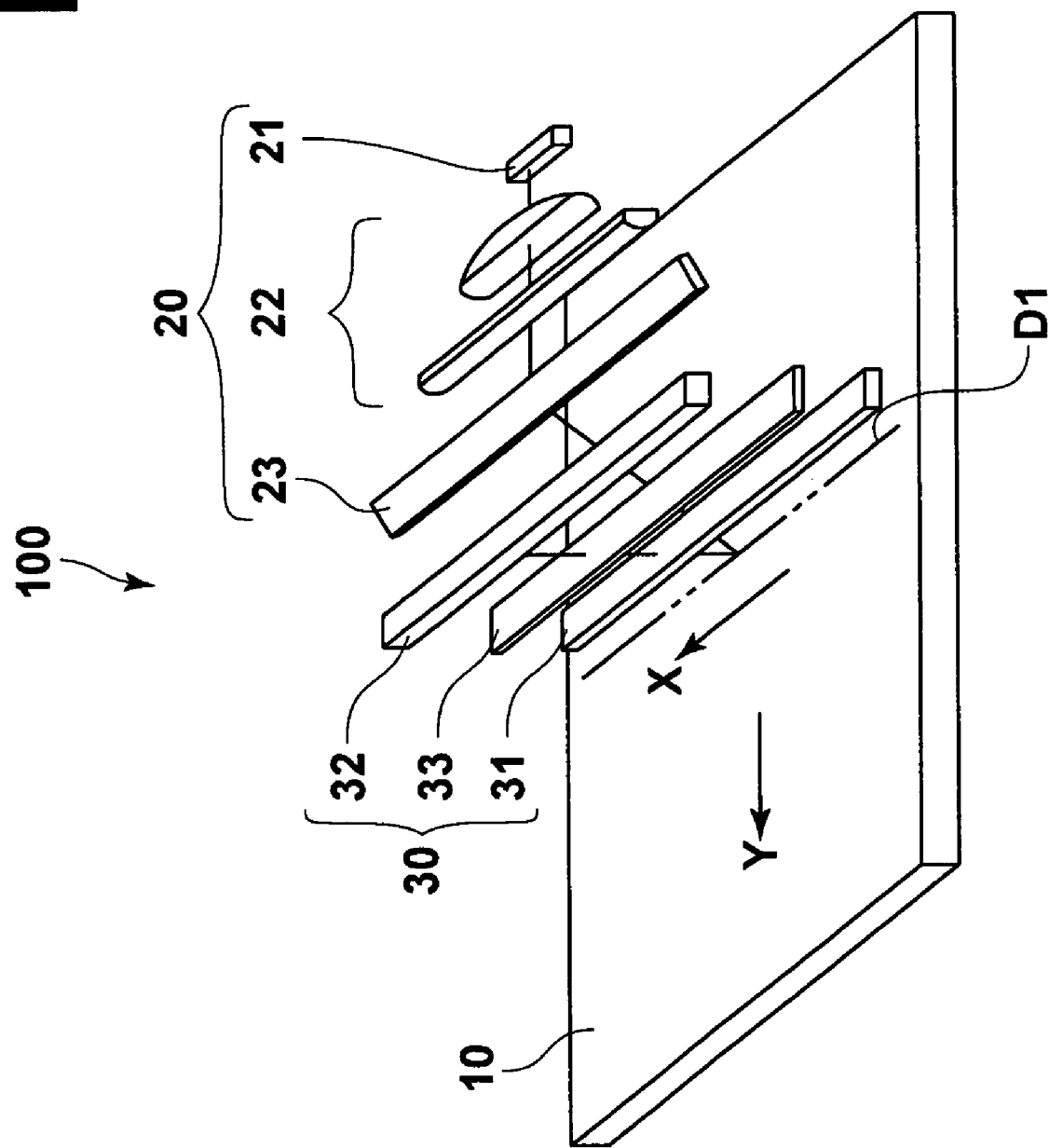
FIG. 1 is a perspective view briefly showing a radiation image read-out apparatus in accordance with an embodiment of the present invention.
Figure 2:
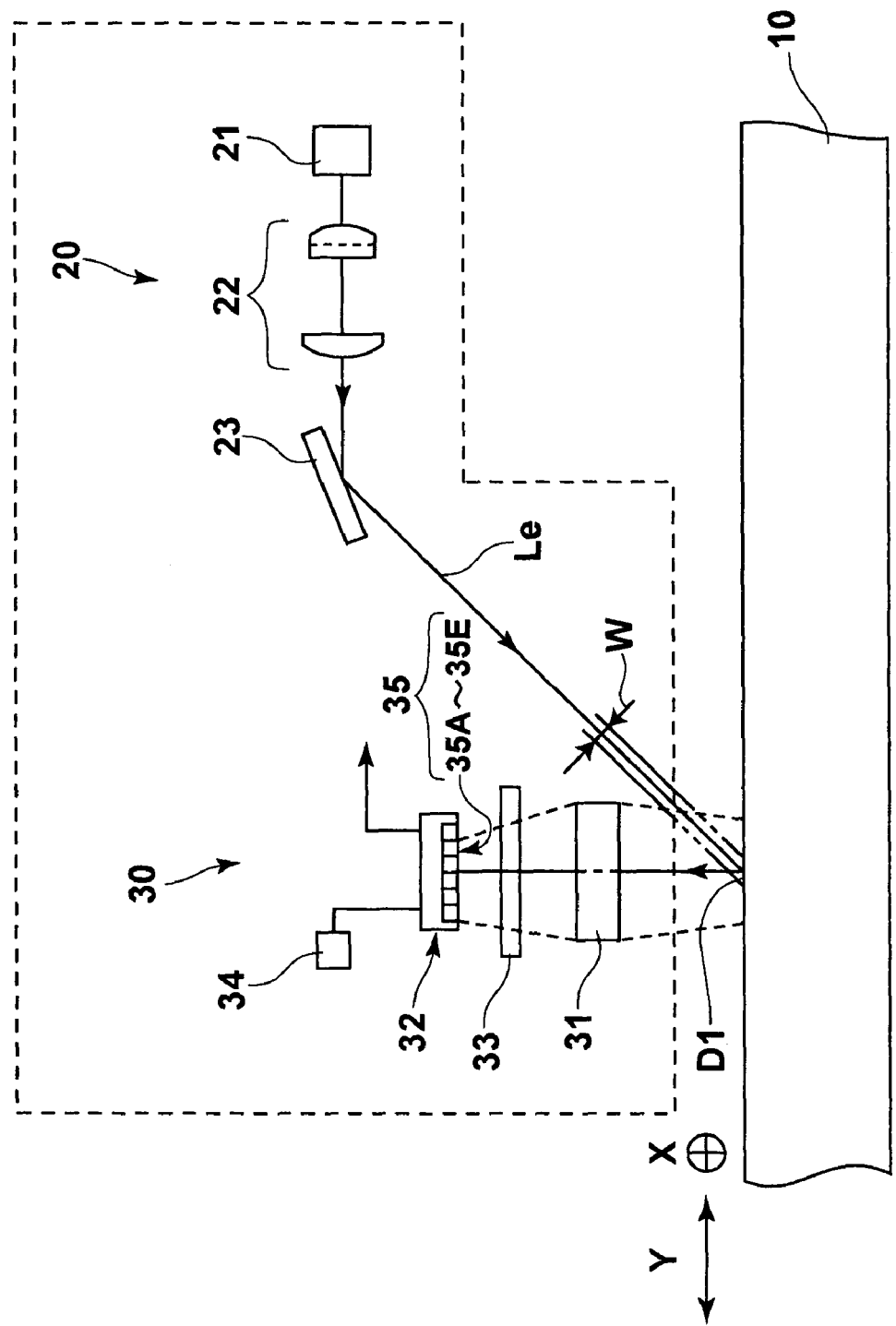
FIG. 2 is a side view showing the stimulating beam projecting system and the line sensor employed in the radiation image read-out apparatus shown in FIG. 1.

In FIGS. 1 and 2, a radiation image read-out apparatus 100 in accordance with an embodiment of the present invention comprises a stimulating light beam projecting system 20 which projects onto a radiation image convertor panel 10 a line-like stimulating light beam Le extending in a main scanning direction X (the direction of arrow X in FIGS. 1 and 2), a line sensor 30 which detects stimulated emission emitted from the radiation image convertor panel 10 upon exposure to the stimulating light beam Le, and a conveyor means (not shown) which conveys the line sensor 30 relatively to the radiation image convertor panel 100 in a sub-scanning direction Y (the direction of arrow Y in FIGS. 1 and 2) intersecting the main scanning direction X.

The stimulating light projecting system 20 comprises a broad area laser 21 which emits a stimulating light beam, a condenser optical system 22 which includes, for instance, a toric lens and converges a line-like stimulating light beam in a line-like area extending in the main scanning direction X on the radiation image convertor panel 10 by way of a reflecting mirror 23, and projects onto the surface of the radiation image convertor panel 10 a line-like stimulating light beam Le which is W in a plane perpendicular to the main scanning direction X.

The line sensor 30 is provided with an imaging lens system 31, a CCD 32, a stimulating light cut filter 33 and a binning control system 34. The CCD 32 comprises a number light receiving portions 35 which a two-dimensionally arranged along the main scanning direction X as a whole, and outputs electric charges obtained by photoelectrically converting the stimulated emission received by the light receiving portions 35 of the CCD 32 after binning the electric charges in a direction perpendicular to the main scanning direction X under the control of the binning control system 34. The light receiving portions 35 of the CCD 32 are arranged in a direction perpendicular to the main scanning direction X over a distance five times the width W of the stimulating light beam. The imaging lens system 31 comprises a number of lenses arranged in the main scanning direction X and forms an erected image of the line-like area of the radiation image convertor panel 10 exposed to the stimulating light beam Le on the CCD 32 at unit magnification. The stimulating light cut filter 33 is inserted between the imaging lens system 31 and the CCD 32 and prevents the stimulating light mingled in the stimulated emission emitted from the radiation image convertor panel 10 from impinging upon the CCD 32.

The pixel size in the main scanning direction of each of the light receiving portions 35 is smaller than a pixel size which is the largest in pixel sizes at which a radiation image can be read out from the radiation image convertor panel 10 at a predetermined resolution. The line sensor 30 receives stimulated emission emitted from the radiation image convertor panel 10 over its entire width. The line sensor 30 may comprise a plurality of CCDs. In this case, the CCDs may be, for instance, arranged end to end in the main scanning direction or in a staggered fashion.

The stimulating light projecting system 20 and the line sensor 30 are integrated with each other and are simultaneously conveyed in the sub-scanning direction by said conveyor means.

Operation of the radiation image read-out apparatus 100 of this embodiment will be described, hereinbelow.

A stimulating light beam emitted from the broad area laser 21 is converged in a line-like area D1 extending in the main scanning direction X on the radiation image convertor panel 10 by way of the condenser optical system 22 and the reflecting mirror 23. The stimulated emission emitted from the line-like area D1 of the radiation image convertor panel 10 upon exposure to the stimulating light beam Le is imaged on the respective light receiving portions 35 of the CCD 32 by the imaging lens system 31 and is photoelectrically converted by the respective light receiving portions 35 to be output as electric image signal components. While projecting the stimulating light beam Le and detecting the stimulated emission, the stimulating light projecting system 20 and the line sensor 30 are simultaneously conveyed by said conveyor means in the sub-scanning direction Y, whereby an image recorded on the radiation image convertor panel 10 is read out.

Figure 3A:
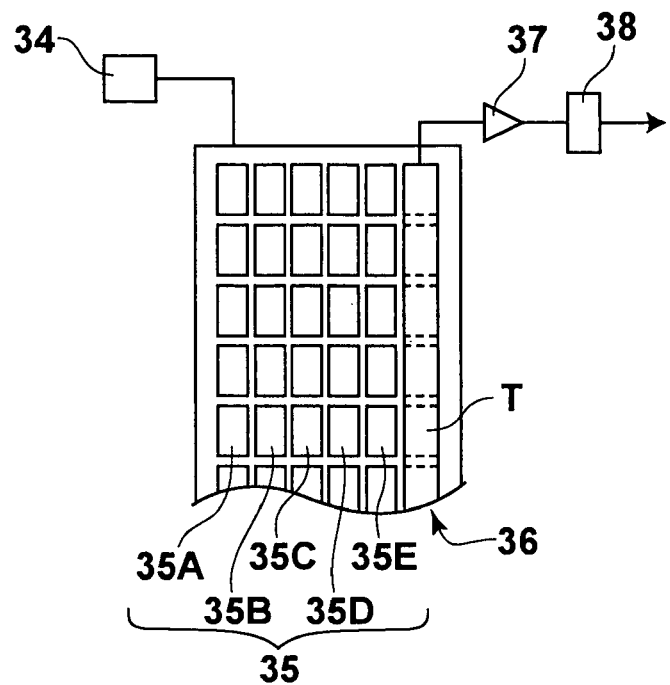
FIG. 3A is an enlarged side view of the line sensor for illustrating binning of the electric charges obtained by photoelectrically converting the amounts of stimulated emission received by respective light receiving portions arranged in a direction perpendicular to the main scanning direction.
Figure 3B:
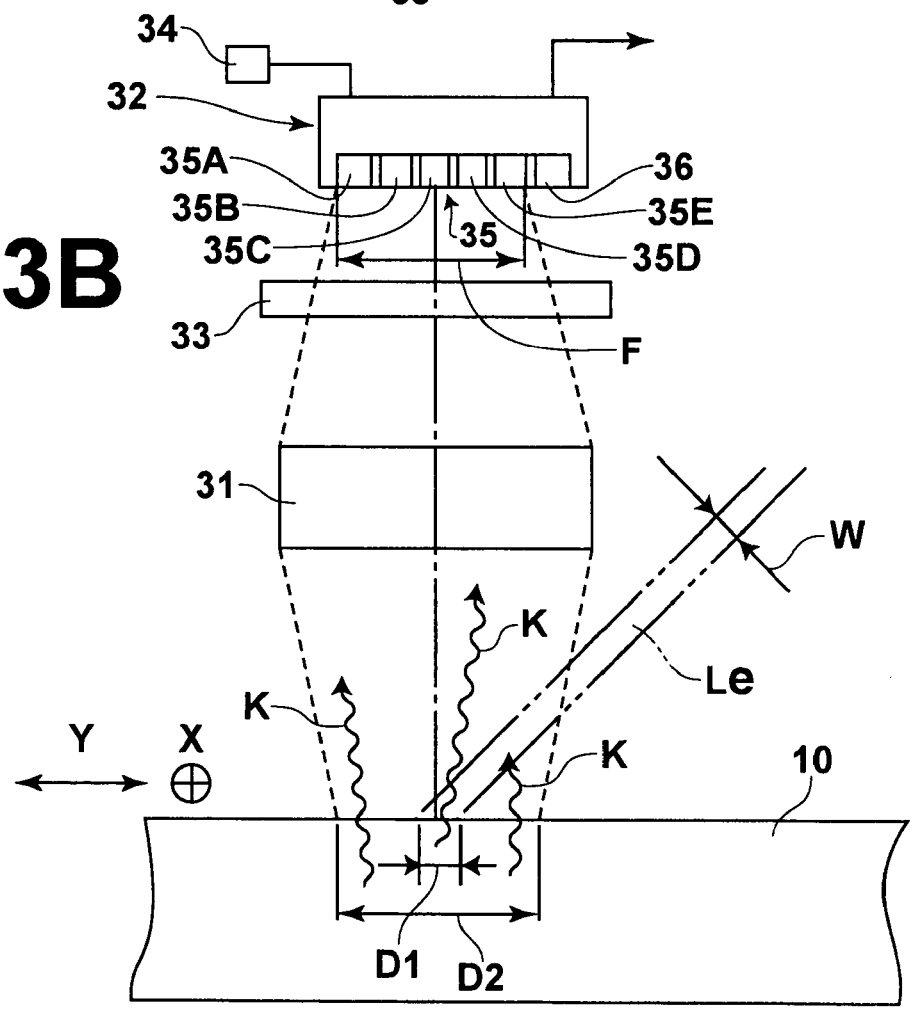
FIG. 3B is an enlarged bottom view of the line sensor for illustrating the same.

Binning of electric charges obtained through photoelectric conversion by a plurality of light receiving portions 35 arranged in a direction perpendicular to the main scanning direction will be described with reference to FIGS. 3A and 3B, hereinbelow.

It is assumed here that the binning is carried out on electric charges obtained through light receiving portions 35 corresponding to one pixel of a radiation image.

The line-like stimulating light beam Le of a width W emitted from the stimulating light projecting system 20 impinges upon a line-like area D1 on the radiation image convertor panel 10. The part of the radiation image convertor panel 10 exposed to the stimulating light beam Le emits stimulated emission. The stimulated emission is scattered in the radiation image convertor panel 10, and radiated from an area D2 which includes the area D1 and extends in the sub-scanning direction Y five times as large as the width W of the stimulating light beam Le. The stimulated emission K radiated from the area D2 carries thereon radiation image information recorded in the area D1. The width of area D1 is the length in the sub-scanning direction of one pixel of the radiation image recorded on the radiation image convertor panel 10.

The area D2 is imaged on area F on the CCD 32 as an erected image at unit magnification. The area F substantially conforms to the area over which the light receiving portions 35 are arranged. Accordingly, a large part of the stimulated emission radiated from the area D2 is received by the light receiving portions 35 in the area F.

In the area F, discrete light receiving portions 35A to 35E are arranged in a direction perpendicular to the main scanning direction X and the stimulated emission radiated from the area D2 is received by the discrete light receiving portions 35A to 35E. The stimulated emission received by the discrete light receiving portions 35A to 35E all carries thereon radiation image information recorded in the area D1 of the radiation image convertor panel 10.

The electric charges obtained through photoelectric conversion by the light receiving portions 35A to 35E are sent to a horizontal transfer register 36 and are united into electric charges T representing one pixel under the control of the binning control system 34. The electric charges T representing one pixel are transferred through the horizontal transfer register 36 and amplified by amplification system 37 as an image signal component represented by an electric voltage or an electric current. Thereafter, the amplified image signal component is digitized by an A/D convertor 38 and output as a digital image signal component for one pixel of a radiation image recorded on the radiation image convertor panel 10.

As can be understood from the description above, in the radiation image read-out apparatus 100 of this embodiment, the electric charges obtained by photoelectric conversion in the light receiving portions 35A to 35E arranged in the sub-scanning direction Y are once subjected to binning and an image signal component based on the electric charges after binning is amplified. Accordingly, amplified noises are suppressed from mingling in the image signal while the amount of the stimulated emission received by the line senor can be increased in the sub-scanning direction, whereby the S/N of an image signal representing a radiation image can be improved.

The length by which the light receiving portions are arranged in a direction perpendicular to the main scanning direction X is not limited by the width of the stimulating light beam or the like.

The sub-scanning direction need not be perpendicular to the main scanning direction so long as it intersects the main scanning direction.

When the line sensor is arranged to carry out binning in the main scanning direction on the charges after binning in a direction perpendicular to the main scanning direction, noise in the image signal can be further reduced.

Further, it is possible to process the image signal so that response at or above Nyquist frequency is deteriorated by pixel density transformation after A/D conversion, thereby suppressing conversion of high frequency components to low frequency components, i.e., influence of so-called aliasing noise.

Figure 4:
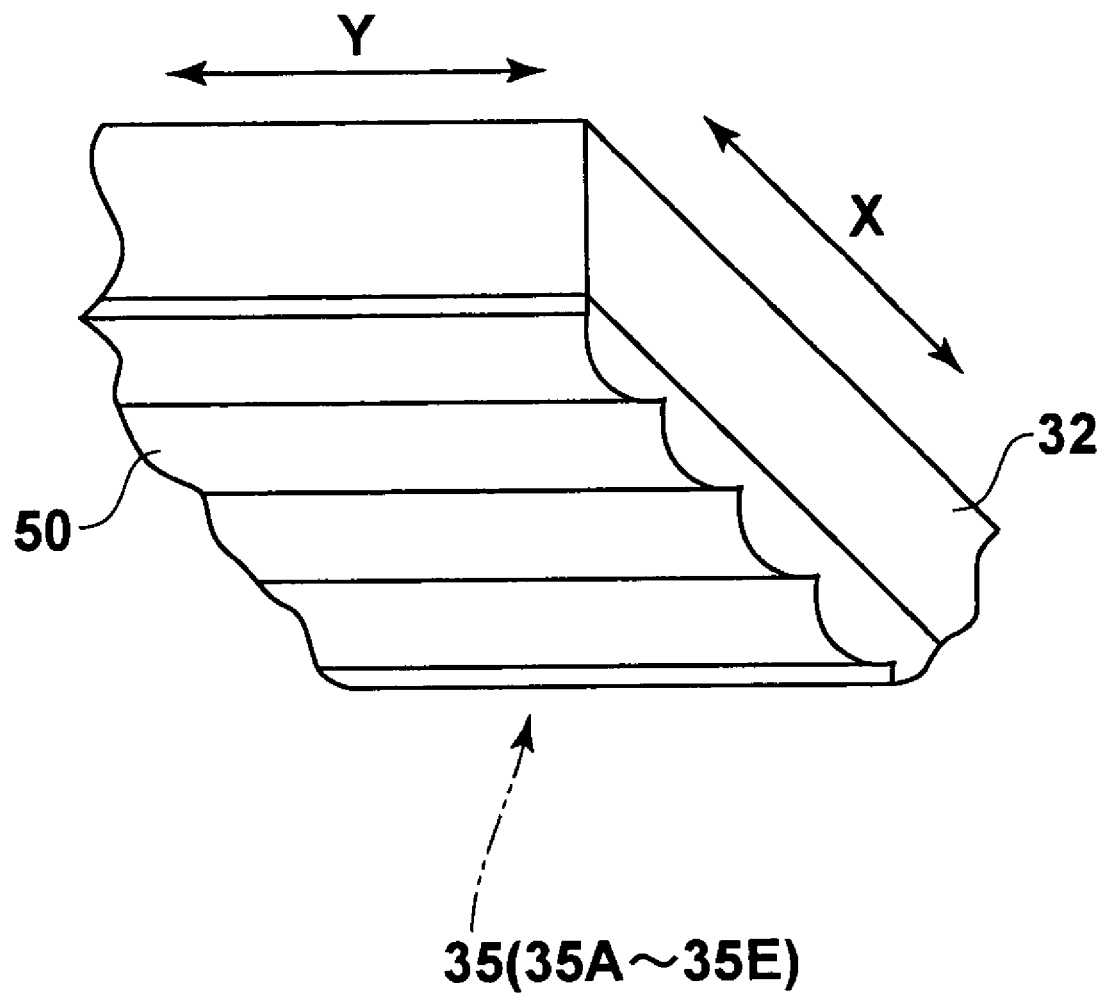
FIG. 4 is a perspective view for illustrating a radiation image read-out apparatus in accordance with another embodiment of the present invention.

Further, it is preferred that an array of micro lenses (a micro cylindrical-lens array 50 in this particular embodiment) extending in a direction perpendicular to the main scanning direction be provided in this direction of the light receiving portions 35 of the CCD 32 as shown in FIG. 4 in order to increase the light collecting efficiency.

What is claimed is:

1. A radiation image read-out apparatus which is provided with a line sensor which detects stimulated emission emitted from a radiation image convertor panel upon exposure to a line-like stimulating light beam extending in a main scanning direction and reads out a radiation image recorded on the radiation image convertor panel while moving the line sensor and the radiation image convertor panel relatively to each other in a sub-scanning direction intersecting the main scanning direction, wherein the line sensor comprises a CCD having a number of light receiving portions two-dimensionally arranged along the main scanning direction and outputs electric charges obtained by photoelectrically converting the stimulated emission received by the light receiving portions after binning the electric charges in a direction perpendicular to the main scanning direction, wherein the line sensor has light receiving portions which are arranged in a direction perpendicular to the main scanning direction at least over a distance twice the width of the stimulating light beam, and wherein the light receiving portions are smaller in the pixel size in the main scanning direction than a pixel size which is the largest in pixel sizes at which a radiation image can be read out from the radiation image convertor panel at a predetermined resolution in the main scanning direction.

2. A radiation image read-out apparatus as defined in claim 1 in which the line sensor has light receiving portions which are arranged in a direction perpendicular to the main scanning direction over a distance at least five times the width of the stimulating light beam.

3. A radiation image read-out apparatus as defined in claim 1 in which the line sensor is provided with a micro lens array extending in a direction perpendicular to the main scanning direction in front thereof.

4. A radiation image read-out apparatus as defined in claim 3 in which the micro lens array is provided over an area including the light receiving portions and the charge transfer paths of the CCD.

5. A radiation image read-out apparatus as claimed in claim 1, wherein a register bins the electrical charges in a direction perpendicular to the main scanning direction.

6. A radiation image read-out apparatus as claimed in claim 1 further comprising an amplifier wherein a register bins the electrical charges prior to outputting the electrical charges to the amplifier.

7. A radiation image read-out apparatus as claimed in claim 1, wherein the width of the stimulating light beam comprises an area having an intensity not lower than $$\frac{1}{e^2}$$

of a peak value in light intensity distribution in a direction perpendicular to the main scanning direction.

* * * * *